C. WOOLNOUGH & G. F. WHEELER.
SECTIONAL SPROCKET WHEEL.
APPLICATION FILED MAY 20, 1910.
969,237.
Patented Sept. 6, 1910.
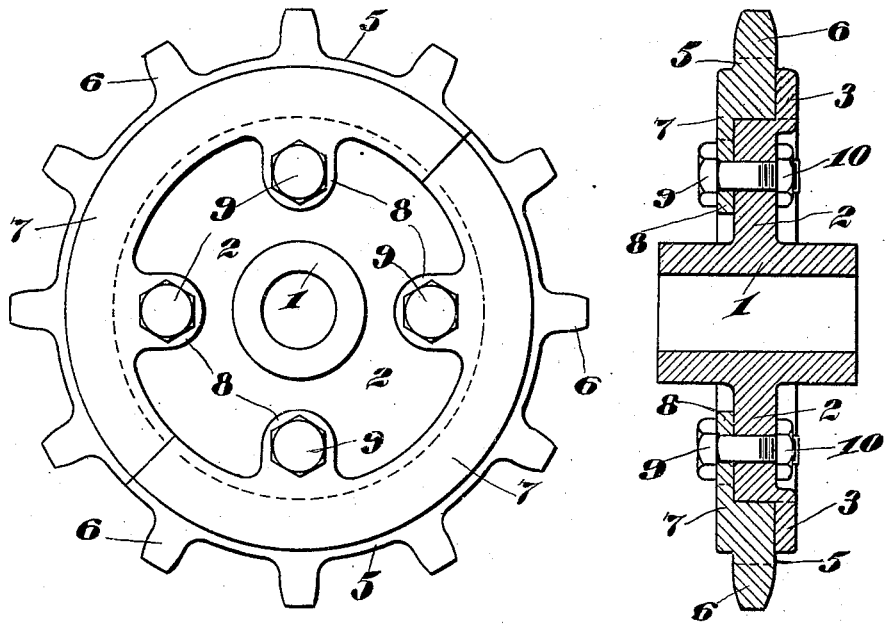
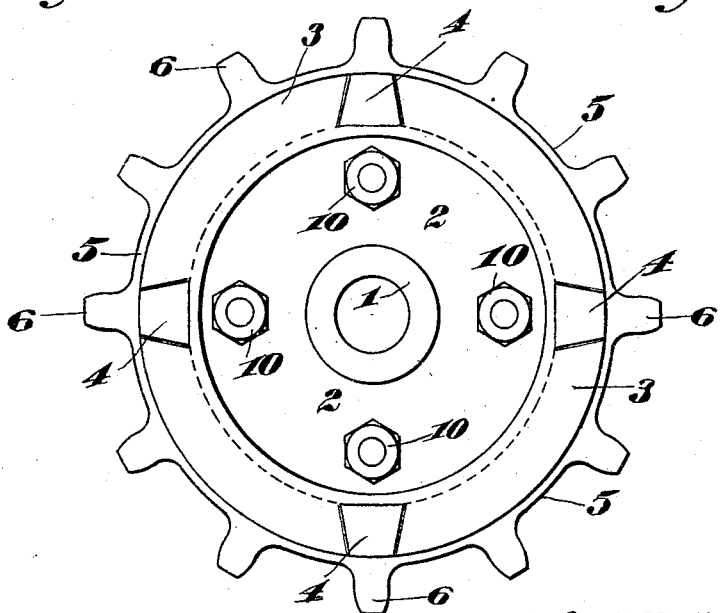
Witnesses:
CHARLES WOOLNOUGH &
GEORGE F. WHEELER
Inventors
By
Attorneys

UNITED STATES PATENT OFFICE.

CHARLES WOOLNOUGH AND GEORGE F. WHEELER, OF MONTREAL, QUEBEC, CANADA.

SECTIONAL SPROCKET-WHEEL.

969,237. Specification of Letters Patent. Patented Sept. 6, 1910.

Application filed May 20, 1910. Serial No. 562,433.

*To all whom it may concern:*

Be it known that we, CHARLES WOOLNOUGH and GEORGE F. WHEELER, both subjects of Great Britain, residing in the city of Montreal, Province of Quebec, Canada, have invented certain new and useful Improvements in Sectional Sprocket-Wheels; and we do hereby declare that the following is a full, clear, and exact description of the invention, such as will enable others skilled in the art to which it appertains to make and use the same.

The invention to be hereinafter described relates to a driving gear and more particularly to sectional sprocket wheels.

Broadly speaking it comprises a tubular flanged hub which may be readily cast or forged or otherwise manufactured a plurality of toothed sections adapted to be removably secured to the hub or to the flange extending therefrom and means for connecting the toothed sections to the hub or the flange of the hub.

In order to more clearly disclose the construction operation and use of the invention reference should be had to the accompanying drawings forming part of the present application.

Throughout the several figures of the drawings like reference characters designate the same parts.

In the drawings:—Figure 1 is a side elevation of the face of the sprocket; Fig. 2 is a central vertical section through the complete device; and Fig. 3 is a view similar to Fig. 1 showing the opposite face of the sprocket.

The main object of the invention is to provide a simple economical and durable sprocket wheel which may be readily and cheaply manufactured and one in which the teeth may be readily renewed or replaced in case of breakage or wear.

Referring to the drawings in detail 1 indicates a hub of usual and well known construction which may be cast or otherwise cheaply and quickly produced. This hub is formed with a circular flange 2 provided with an annular seat shoulder or rim 3. This rim shoulder or seat is formed with dove tailed mortises adapted to receive coöperating tenons 4 projecting from the face of segmental rim sections 5 provided with the usual sprocket teeth 6. These rim sections 5 are formed with flanges 7 adapted to overlie the flange 2 extending from the hub 1 and are provided with perforated ears 8 adapted for the passage of clamping or holding bolts 9 which are passed through perforations in the flange 2 and drawn down to holding position by means of the tightening nuts 10. The mortise and tenon construction provides a simple solid and efficient connection between the sections 5 and the flange 2.

It is thought that the operation and use of the invention will be clear from the preceding detailed description.

Changes may be made in the construction arrangement and disposition of the several parts of the invention without in any way departing from the field and scope of the same and it is meant to include all such within this application wherein only a preferred form has been disclosed.

Having thus fully described our invention what we claim as new and desire to secure by Letters Patent is:—

A sectional sprocket wheel comprising a hub provided with a flange having an offset rim or shoulder said rim or shoulder being provided with dove tail mortises toothed rim sections provided with flanges having perforated ears said rim sections being adapted to be seated on the shoulder of the aforesaid flange of the aforesaid hub and being provided with dove tail tenons adapted to coöperate with the aforesaid dove tail mortises and means for securing said rim sections in operative position.

In witness whereof we have hereunto set our hands in the presence of two witnesses.

CHARLES WOOLNOUGH.
GEORGE F. WHEELER.

Witnesses:
W. S. BABCOCK,
E. J. GAUVIN.